(12) United States Patent
Sekihara et al.

(10) Patent No.: US 9,694,675 B2
(45) Date of Patent: Jul. 4, 2017

(54) FUEL SUPPLY APPARATUS

(71) Applicant: TOYODA GOSEI CO., LTD., Kiyosu-shi, Aichi-ken (JP)

(72) Inventors: Atsushi Sekihara, Kiyosu (JP); Yoshinari Hiramatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/067,654

(22) Filed: Mar. 11, 2016

(65) Prior Publication Data
US 2016/0272478 A1 Sep. 22, 2016

(30) Foreign Application Priority Data

Mar. 19, 2015 (JP) ................................. 2015-055766
Mar. 19, 2015 (JP) ................................. 2015-055767

(51) Int. Cl.
*B60K 15/04* (2006.01)
*B60K 15/035* (2006.01)

(52) U.S. Cl.
CPC .... *B60K 15/04* (2013.01); *B60K 2015/03538* (2013.01); *B60K 2015/047* (2013.01); *B60K 2015/0464* (2013.01)

(58) Field of Classification Search
CPC .................... B60K 15/04; B60K 2015/0458
USPC .................... 141/350, 370, 372; 220/86.2
See application file for complete search history.

(56) References Cited

U.S. PATENT DOCUMENTS

| 5,033,517 A | * | 7/1991 | Bucci | ............... | B60K 15/04 |
| | | | | | 141/286 |
| 5,322,100 A | * | 6/1994 | Buechler | ............ | B60K 15/04 |
| | | | | | 137/588 |
| 8,220,508 B2 | | 7/2012 | Rongstock | | |
| 2009/0084464 A1 | | 4/2009 | Hagano | | |
| 2016/0272063 A1 | * | 9/2016 | Sekihara | ............ | B60K 15/04 |

FOREIGN PATENT DOCUMENTS

| CA | 2381575 A1 | 2/2001 |
| JP | 2003-507615 A | 2/2003 |
| JP | 2009-083569 A | 4/2009 |
| JP | 2012-116380 A | 6/2012 |
| JP | 2013-001285 A | 1/2013 |

\* cited by examiner

*Primary Examiner* — Timothy L Maust
*Assistant Examiner* — Timothy P Kelly
(74) *Attorney, Agent, or Firm* — Posz Law Group, PLC

(57) ABSTRACT

An object is to provide a fuel supply apparatus that is configured to enhance the strength of a fitting portion of a filler neck body that is fit in a tube. The fuel supply apparatus (FS) comprises a filler neck body (110) that is configured to include a hollow fuel passage-forming portion (110a) arranged to define a fuel passage (100P) which a supplied fuel passes through, and a fitting portion (111) configured to be fit in a tube (40) arranged to introduce the supplied fuel to a fuel tank (FT); a nozzle guide (150) that is placed inside of the fuel passage-forming portion (110a) and is configured to introduce a fueling nozzle (NZ) for supplying the fuel; and a first rib (151) that is provided at a position opposite to the fitting portion (111) to be placed between the filler neck body (110) and the nozzle guide (150) and to be in contact with an outer circumferential surface of the nozzle guide (150).

18 Claims, 13 Drawing Sheets

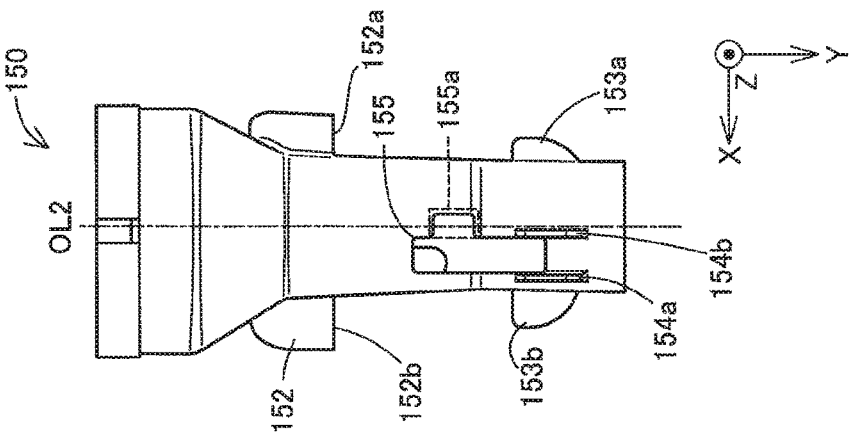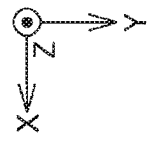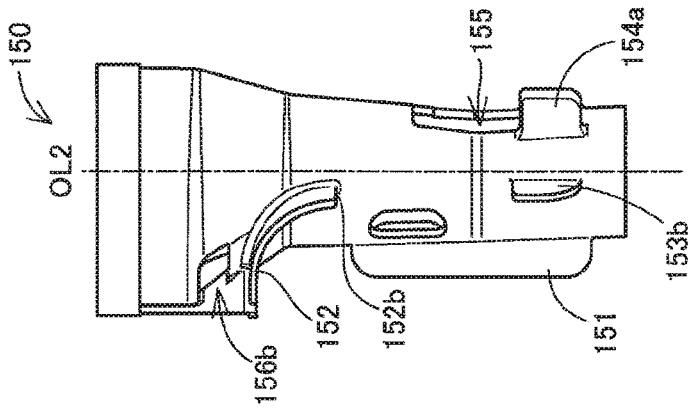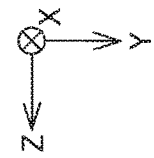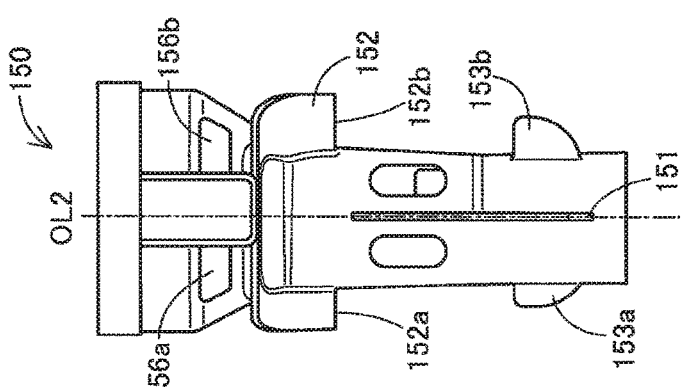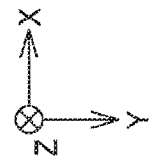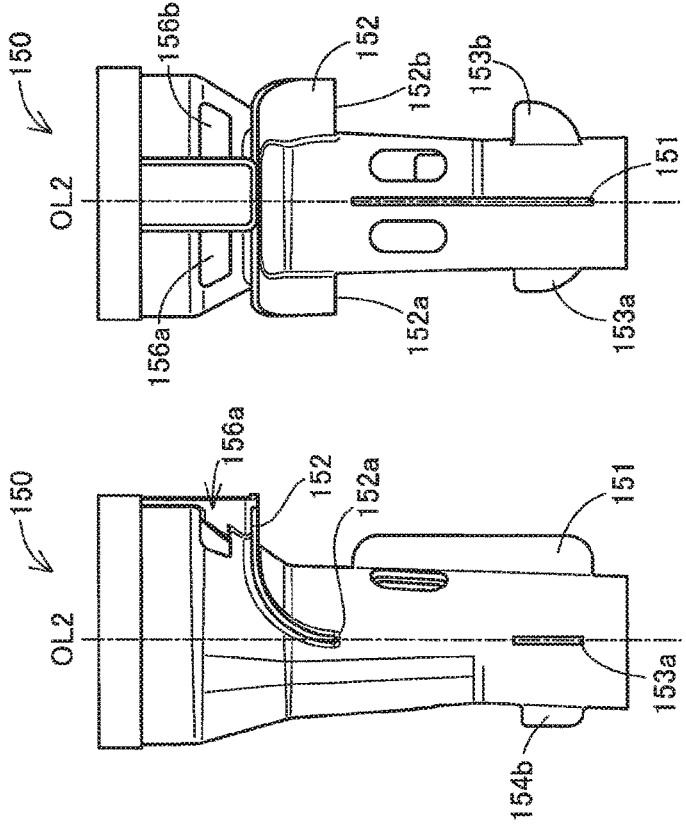

FUEL SUPPLY APPARATUS

CROSS-REFERENCE TO RELATED APPLICATIONS

The present application claims priorities from Japanese patent applications P2015-55766 and P2015-55767 filed on Mar. 19, 2015, the content of which is hereby incorporated by reference into this application.

TECHNICAL FIELD

The present invention relates to a fuel supply apparatus.

DESCRIPTION OF RELATED ART

A fuel supply apparatus having an opening provided in the middle of a fuel passage to open and close the fuel passage has been known as a fuel supply apparatus configured to introduce a supplied fuel to a fuel tank of a motor vehicle. JP 2009-83569A describes a nozzle guide that is placed inside of a filler neck body and is configured to introduce a fueling nozzle toward a fuel tank and suppress the fuel vapor generated by vaporization in the fuel tank and splash of the fuel during fueling from leaking out of the vehicle. JP 2012-116380A describes a guide apparatus for a fueling nozzle in which a protrusion formed inside of a filler neck body engages with a fuel tank-side outer circumferential surface of a nozzle guide. JP 2003-507615A describes a cooling pipe for internal combustion engine having a detent connection mechanism in which a detent element is integrally formed to connect one end of a pipe placed inside with one end of a hose placed outside. JP 2013-1285A describes a filter for fuel having a vent configured to connect a space defined by an inner circumferential surface of a filler neck body and an outer circumferential surface of a nozzle guide placed inside of the filler neck body to the outside air. U.S. Pat. No. 8,220,508 describes a nozzle guide having a plurality of openings formed to make inside of a tubular nozzle guide communication with outside.

A known configuration of a fuel supply apparatus has a filler tube that is to be connected with a tubular portion formed on a fuel tank-side of a filler neck body, in order to supply a fuel from a fueling nozzle to a fuel tank. None of JP 2009-83569A, JP 2012-116380A and JP 2003-507615A describes a technique of enhancing the strength of the tubular portion of the filler neck body, in order to prevent deformation and damage of the filler neck body. Press-fitting and connecting the filler tube to cover the tubular portion of the filler neck body generates a force applied to inward of the tubular portion. There is accordingly a need for enhancing the strength of the tubular portion. There is also a need for enhancing the strength of the tubular portion against an external force applied other than the stress by press-fitting of the filler tube. With a requirement for small-sized motor vehicles, there is also a need for further downsizing the fuel supply apparatus mounted on the motor vehicle.

SUMMARY

In order to solve at least part of the problems described above, the invention may be implemented by the following aspects or configurations.

(1) According to one aspect of the invention, there is provided a fuel supply apparatus. This fuel supply apparatus comprises a filler neck body that is configured to include a hollow fuel passage-forming portion arranged to define a fuel passage which a supplied fuel passes through, and a fitting portion configured to be fit in a tube arranged to introduce the supplied fuel to a fuel tank; a nozzle guide that is placed inside of the fuel passage-forming portion and is configured to introduce a fueling nozzle for supplying the fuel; and a first rib that is provided at a position opposite to the fitting portion to be placed between the filler neck body and the nozzle guide and to be in contact with an outer circumferential surface of the nozzle guide. In the fuel supply apparatus of this aspect, the first rib enhances the strength of the fitting portion against an external force applied to the inner circumference of the filler neck. The presence of the first rib reduces a clearance between the fuel passage-forming portion and the outer circumferential surface of the nozzle guide and enables the inner diameter of the nozzle guide to be set according to the diameter of the fueling nozzle inserted into the nozzle guide. This reduces rattle between the nozzle guide and the fueling nozzle inserted into the nozzle guide. The presence of the first rib also ensures the sufficient capacity of the fuel supply apparatus without increasing the wall thickness even when the length in the axial direction of the fuel supply apparatus is decreased. This allows for downsizing of the fuel supply apparatus.

(2) In the fuel supply apparatus of the above aspect, the first rib may be formed integrally with the nozzle guide to be protruded from the outer circumferential surface of the nozzle guide. This configuration of the fuel supply apparatus enables the rib to be readily manufactured at the position relative to the nozzle guide according to the design values. There is no need to provide the first rib as a separate member different from the filler neck body and the nozzle guide. This reduces the total number of components constituting the fuel supply apparatus and facilitates manufacture of the fuel supply apparatus.

(3) In the fuel supply apparatus of the above aspect, a fuel tank-side end of the nozzle guide and a fuel tank-side end of the first rib may be located on a fuel tank-side of a fuel tank-side end of the filler neck body. In the fuel supply apparatus of this aspect, the first rib provided on the nozzle guide can support an end of the fitting portion which receives a largest force applied in the course of fitting the fitting portion into the tube.

(4) In the fuel supply apparatus of the above aspect, the first rib may comprise a plurality of protrusions that are extended parallel to an axial direction of the nozzle guide. In the fuel supply apparatus of the above aspect, forming a plurality of protrusions as the first rib on the nozzle guide further enhances the strength of the filler neck body against an external force applied inward of the fitting portion.

(5) In the fuel supply apparatus of the above aspect, an amount of protrusion of the first rib in a radial direction at a fuel tank-side end may be reduced toward the fuel tank. This configuration of the fuel supply apparatus avoids the first rib from interfering with fitting of the fitting portion into the tube and enables the fitting portion to be smoothly fit into the tube.

(6) In the fuel supply apparatus of the above aspect, the nozzle guide may introduce the fueling nozzle in a first direction from a body opening of the filler neck body in which the fueling nozzle is inserted toward the fuel tank. The nozzle guide may have an opening configured to make the fuel passage communicate with an outer circumferential space that is defined by the fuel passage-forming portion and an outer circumferential surface of the nozzle guide. The fuel supply apparatus may further comprise a second rib that is provided on a fuel tank-side of the opening and is configured such that the fuel flowing back to the filler neck body after filling the fuel tank is introduced to the opening. A fueling nozzle used to supply the fuel to the fuel supply apparatus may be provided with a gas sensor that is placed on a leading end of the fueling nozzle inserted into the fuel supply apparatus and is configured to prevent overflow of the fuel supplied to the fuel supply apparatus. There is a possibility that some positional relationship of the gas sensor provided on the fueling nozzle to the nozzle guide of the fuel supply apparatus in which the fueling nozzle is inserted detects the fuel supplied to the fuel supply apparatus with some delay and causes the fuel to be overflowed from the fuel supply apparatus. In the fuel supply apparatus of this aspect, however, the second rib formed along the opening is likely to introduce the fuel that is supplied to the fuel supply apparatus to raise the liquid level, toward the opening. This configuration enables the gas sensor provided on the leading end of the fueling nozzle to detect the liquid level of the fuel introduced to the opening at a predetermined direction. The fuel supply apparatus of this aspect enables the gas sensor for the fueling nozzle to more quickly detect the liquid level of the supplied fuel and thereby suppresses overflow of the supplied fuel.

(7) In the fuel supply apparatus of the above aspect, the second rib may be formed adjacent to a portion of the opening other than the fuel tank-side of the opening. This configuration of the fuel supply apparatus introduces the fuel supplied to raise the liquid level, to the lower end of the opening that corresponds to the lowermost position of the liquid level of the supplied fuel. This enables the gas sensor for the fueling nozzle to more quickly detect the liquid level of the supplied fuel.

(8) In the fuel supply apparatus of the above aspect, the second rib may be formed integrally with the nozzle guide to be protruded radially outward from the outer circumferential surface of the nozzle guide. In the fuel supply apparatus of this aspect, the second rib is formed in the nozzle guide in which the opening is formed. This enables the second rib to be readily manufactured at the position relative to the opening according to the design values. This reduces the total number of components placed inside of the filler neck body and facilitates manufacture of the fuel supply apparatus.

(9) In the fuel supply apparatus of the above aspect, the second rib may be formed to be protruded linearly parallel to the first direction. In the fuel supply apparatus of this aspect, the second rib is formed parallel to the first direction that corresponds to the direction in which the liquid level of the supplied fuel rises. This configuration enables the fuel supplied to raise the liquid level, to be more smoothly introduced to the opening.

(10) In the fuel supply apparatus of the above aspect, a plurality of the second ribs may be formed symmetrically with respect to the opening in the first direction. The fuel supply apparatus of this aspect enables the fuel supplied to raise the liquid level, to be more smoothly introduced to the lower end of the opening.

The invention may be implemented by any of various aspects other than the fuel supply apparatus, for example, a motor vehicle with the fuel supply apparatus mounted thereon and a method of manufacturing the fuel supply apparatus.

According to the above aspects of the invention, the first rib enhances the strength of the fitting portion against an external force applied to the inner circumference of the filler neck. The presence of the first rib reduces a clearance between the fuel passage-forming portion and the outer circumferential surface of the nozzle guide and enables the inner diameter of the nozzle guide to be set according to the diameter of the fueling nozzle inserted into the nozzle guide. This reduces rattle between the nozzle guide and the fueling nozzle inserted into the nozzle guide. The presence of the first rib also ensures the sufficient capacity of the fuel supply apparatus without increasing the wall thickness even when the length in the axial direction of the fuel supply apparatus is decreased. This allows for downsizing of the fuel supply apparatus.

BRIEF DESCRIPTION OF DRAWINGS

FIG. 7A is a left side view illustrating a nozzle guide;

FIG. 7B is a front view illustrating the nozzle guide;

FIG. 7C is a right side view illustrating the nozzle guide;

FIG. 7D is a rear view illustrating the nozzle guide;

DESCRIPTION OF EMBODIMENTS (1) General Configuration of Fuel Supply Apparatus FS FIG. 1 is a perspective view illustrating a filler port of a motor vehicle that is equipped with a fuel supply apparatus FS according to an embodiment. FIG. 1 illustrates the fuel supply apparatus FS that is configured to form a fuel passage for introducing a supplied fuel to a fuel tank (not shown) provided inside of the motor vehicle, and members placed in a neighborhood of the fuel supply apparatus FS. A fuel lid FL is held in an openable and closable manner on the vehicle body of the motor vehicle. The fuel lid FL has a lid main body FLa formed in a shape along the outer panel of the vehicle body. The lid main body FLa is supported in an openable and closable manner on the outer panel of the vehicle body via a hinge FLb. The space accessible by opening the fuel lid FL serves as a fuel filler chamber FR. An open-close device 10 for fuel tank mounted on a base plate BP is placed in this fuel filler chamber FR. The open-close device 10 for fuel tank is a mechanism configured to introduce the fuel through the fuel supply apparatus FS to a fuel tank without using a fuel cap. More specifically the open-close device 10 for fuel tank is a mechanism configured to open and close the fuel passage with an external force from a fueling nozzle after opening the fuel lid FL.

FIG. 2 is a perspective view illustrating insertion of a fueling nozzle NZ to supply the fuel to the fuel supply apparatus FS. FIG. 2 illustrates the state that a leading end NZa of the fueling nozzle NZ is inserted into the open-close device 10 for fuel tank to supply the fuel to the fuel supply apparatus FS. According to this embodiment, the fuel lid FL is arranged to be opened leftward when the fuel filler chamber FR is viewed from the front side. The fueling nozzle NZ inserted into the open-close device 10 for fuel tank is rotatable counterclockwise about an axis OL1 from the fueling nozzle NZ to the open-close device 10 for fuel tank. Clockwise rotation of the fueling nozzle NZ is, however, limited since the fuel lid FL interferes with the fueling nozzle NZ. According to another embodiment, the positional relationship between the fuel lid FL and the fueling nozzle NZ inserted into the open-close device 10 for fuel tank may be modified in various ways.

FIG. 3 is a schematic diagram illustrating the positional relationship of the fuel supply apparatus FS to a fuel tank FT provided inside of the motor vehicle. The fuel supply apparatus FS includes a filler neck 100, a filler tube 40, a breather pipe 50, a flow control valve 60 and a check valve 30. The filler neck 100 is connected connected with the fuel tank FT by the filler tube 40 and the breather pipe 50. The filler tube 40 is connected with the fuel tank FT via the check valve 30. The breather pipe 50 is connected with the fuel tank FT via the flow control valve 60. The breather pipe 50 is located above the filler tube 40 in the vertical direction, so that the supplied fuel passes through the filler tube 40 and does not flow in the breather pipe 50. The fuel vapor generated by vaporization in the fuel tank FT is circulated from the fuel tank FT through the breather pipe 50 to the fuel passage formed in the filler neck 100.

(2) Detailed Configuration of Filler Neck 100

Figure 4A:
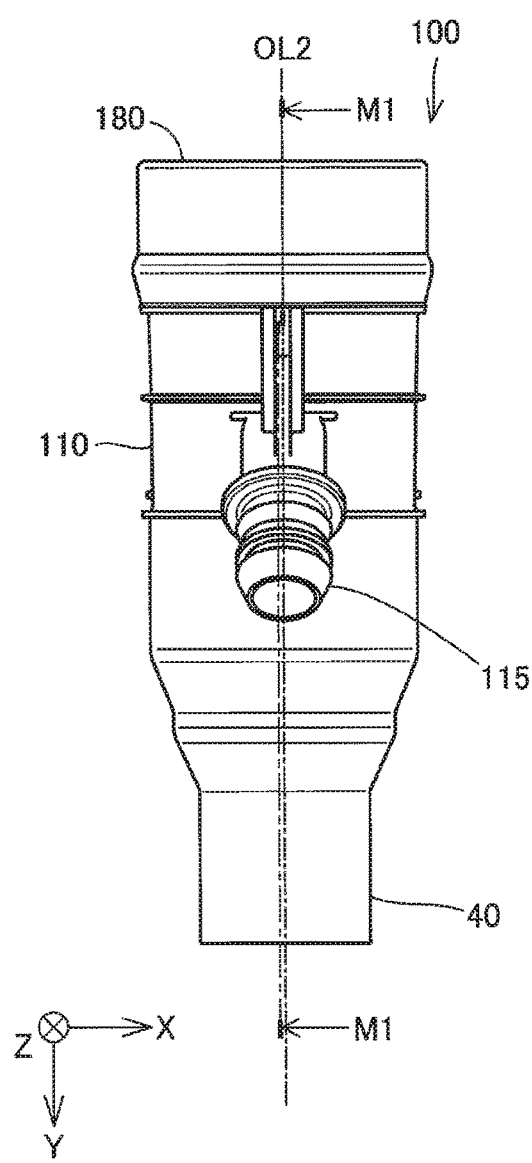
FIG. 4A is an appearance diagram illustrating a filler neck connecting with a filler tube.
Figure 4B:
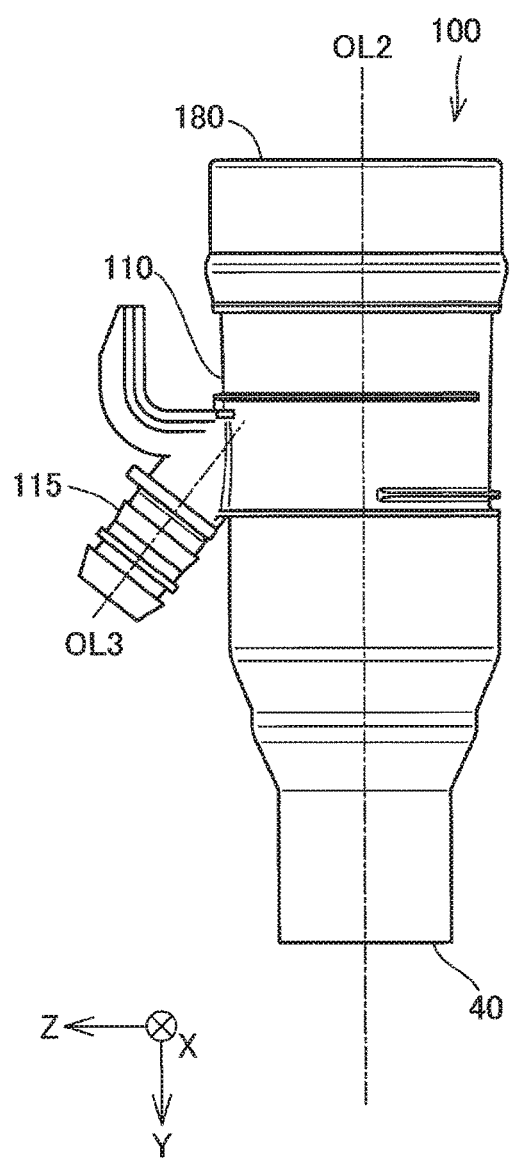
FIG. 4B is an appearance diagram illustrating the filler neck connecting with the filler tube.

FIGS. 4A and 4B are appearance diagrams illustrating the filler neck 100 connecting with the filler tube 40. More specifically, FIG. 4A is a front view illustrating the filler neck 100 connecting with the filler tube 40, and FIG. 4B is a right side view illustrating the filler neck 100 connecting with the filler tube 40. The filler neck 100 includes a filler neck body 110, a mouthpiece 180 that is provided to cover an upstream side of the filler neck body 110 and a nozzle guide 150 (not illustrated in FIGS. 4A and 4B) placed inside of the filler neck body 110. In the description of the embodiment, a fuel supply side (upper side in FIGS. 4A and 4B) of the filler neck 100 is called upstream side, and an opposite side of the filler neck 100 connecting with the filler tube 40 (lower side in FIGS. 4A and 4B) is called downstream side.

Figure 1:
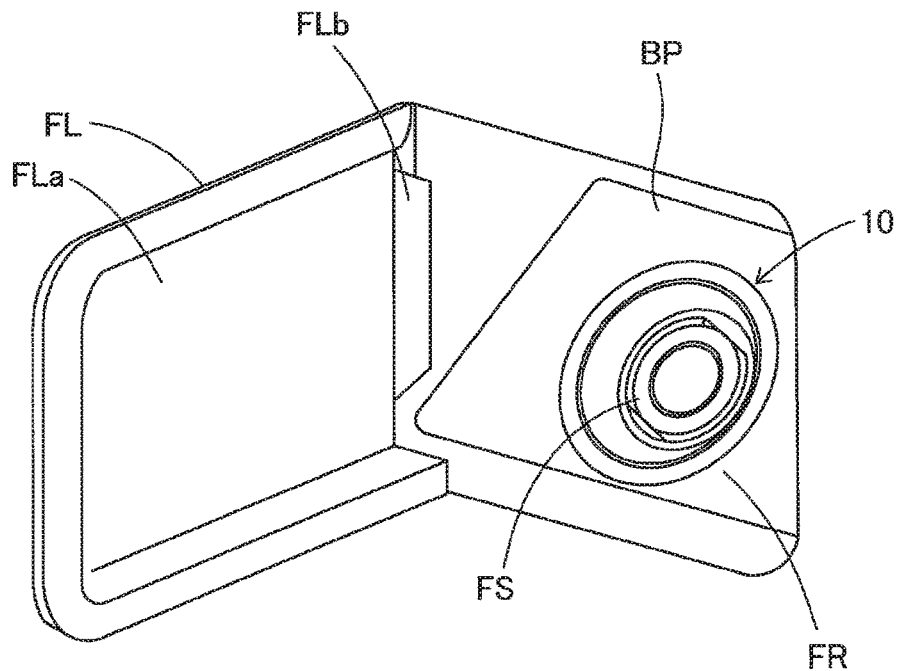
FIG. 1 is a perspective view illustrating a filler port of a motor vehicle equipped with a fuel supply apparatus according to an embodiment.
Figure 2:
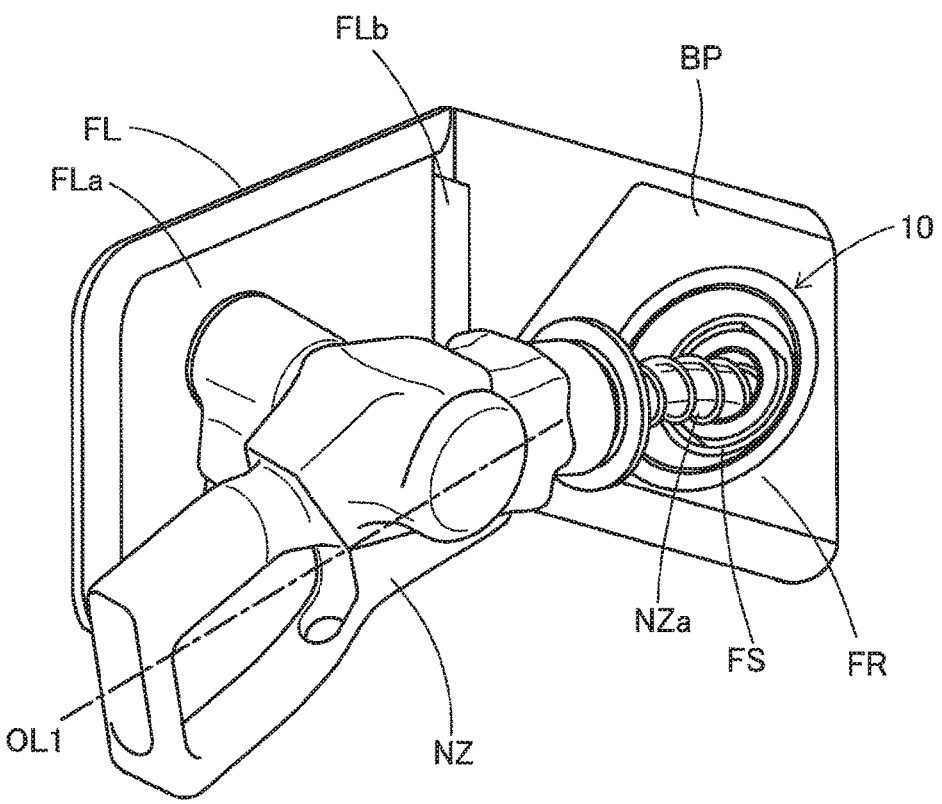
FIG. 2 is a perspective view illustrating insertion of a fueling nozzle to supply a fuel to the fuel supply apparatus.
Figure 3:
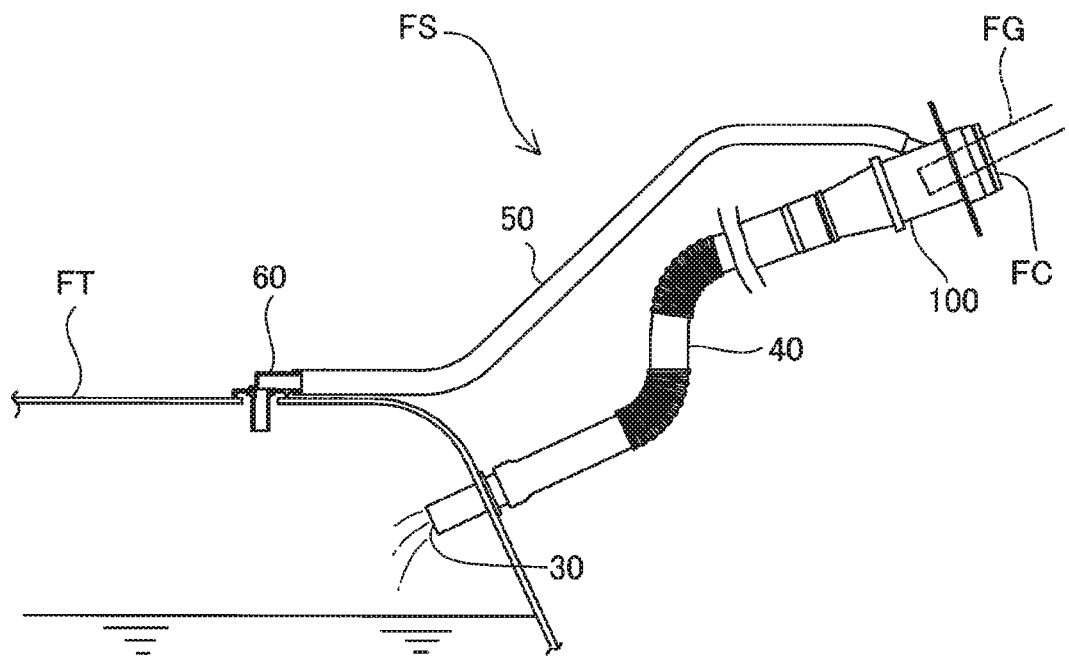
FIG. 3 is a schematic diagram illustrating the positional relationship of the fuel supply apparatus to a fuel tank provided inside of the motor vehicle.

As shown in FIGS. 4A and 4B, the filler neck body 110 is formed in a cylindrical shape connecting the upstream side with the downstream side. The filler neck body 110 has a fuel passage which the supplied fuel passes through. The details of the fuel passage and the nozzle guide 150 will be described later. As shown in FIG. 4B, the filler neck body 110 includes a breather port 115 that branches off from upstream to downstream. The breather port 115 is connected with the breather pipe 50 (shown in FIG. 3) to form part of a route that introduces the fuel vapor circulated through the breather pipe 50 to the fuel passage. The route which the fuel vapor passes through is formed about an axis OL3 inside of the breather port 115. The filler neck body 110 is made of a resin material. The mouthpiece 180 is a member provided to cover a circular opening on the upstream side of the filler neck body 110. The mouthpiece 180 is made of a metal. In the description of the embodiment, a direction from upstream toward downstream in which the fuel supplied to the filler neck 100 passes through the fuel passage is defined as +Y-axis direction. A direction that is parallel to a plane perpendicular to an axis OL2 passing through the center of the fuel passage and intersects with both the axis OL2 and the axis OL3 is defined as +Z-axis direction. An axis perpendicular to both the Y axis and the Z axis is defined as X axis.

Figure 5:
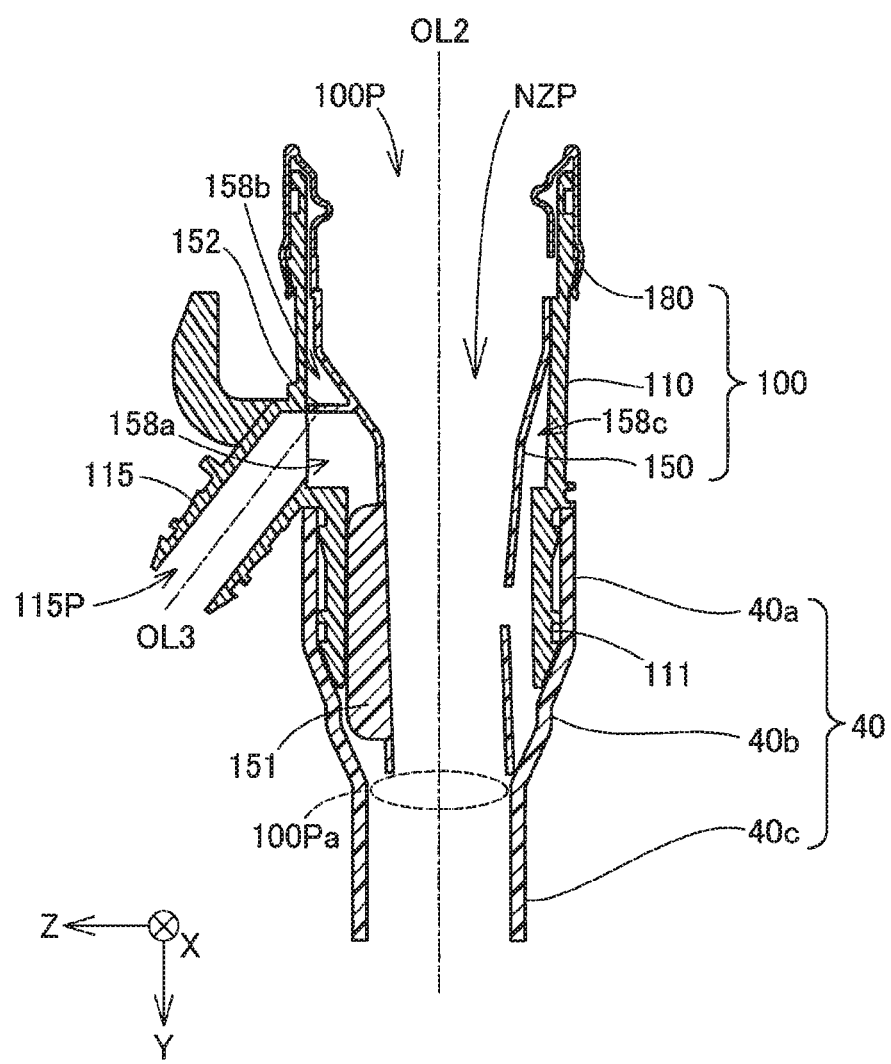
FIG. 5 is a sectional view taken along a line M1-M1 in FIG. 4A.
Figure 6:
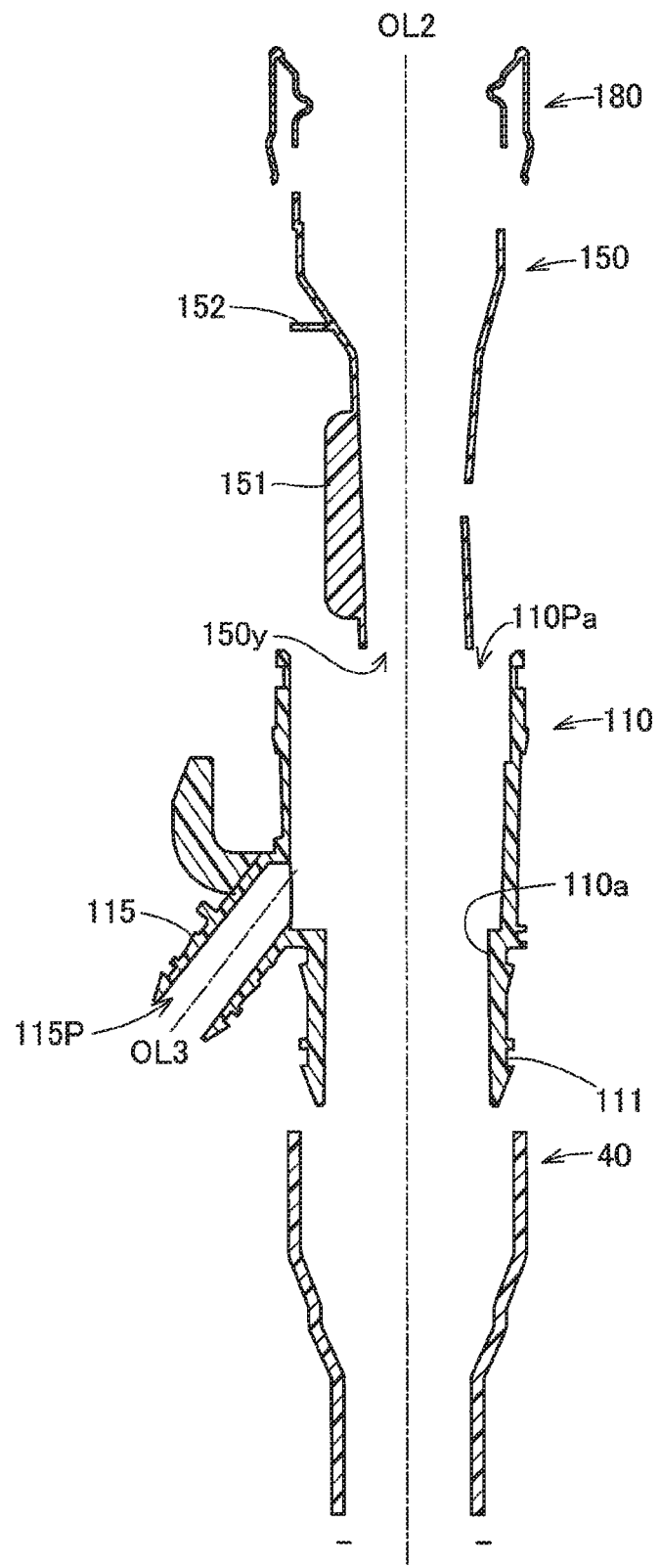
FIG. 6 is an exploded sectional view illustrating the filler tube and the filler neck.

FIG. 5 is a sectional view taken along a line M1-M1 in FIG. 4A. FIG. 6 is an exploded sectional view illustrating the filler tube 40 and the filler neck 100. The sectional view of FIG. 5 illustrates the filler neck 100 connecting with the filler tube 40. The sectional view of FIG. 6 illustrates disassembly of the respective components in the sectional view of FIG. 5. The filler neck 100 includes the filler neck body 110, the mouthpiece 180 that is fit in an opening 110Pa on the upstream side of the filler neck body 110, and the nozzle guide 150 that is placed inside of the filler neck body 110. The filler neck body 110 has an inner circumferential surface 110a provided to internally form a fuel passage 100P and is formed in a cylindrical shape to have the sectional area reduced toward downstream. The filler neck body 110 has a corrugated portion 111 that is formed in a corrugated shape on an outer circumferential surface on the downstream side to allow the filler tube 40 to be press-fit on. The breather port 115 of the filler neck body 110 forms an introduction path 115P arranged to introduce the fuel vapor circulated from the fuel tank FT through the breather pipe 50 to the fuel passage 100P. The filler neck 100 is manufactured by placing the nozzle guide 150 inside of the filler neck body 110 and subsequently fitting the mouthpiece 180 at the opening 110Pa of the filler neck body 110.

The nozzle guide 150 is a cylindrical member that is fit and placed in the filler neck body 110. The nozzle guide 150 has an inner circumferential surface that forms a nozzle guide path NZP as part of the fuel passage 100P. The inner circumferential surface of the nozzle guide 150 is formed to have the sectional area reduced from upstream to downstream. The nozzle guide path NZP having the sectional area reduced from upstream to downstream serves to introduce the leading end NZa of the fueling nozzle NZ inserted into the fuel passage 100P toward downstream in the fuel passage 100P. The nozzle guide 150 has a vapor guide portion 152 configured to introduce the fuel vapor that is introduced through the introduction path 115P to the filler neck body 110, to downstream. The detailed configuration of the vapor guide portion 152 will be described later.

As shown in FIG. 5, the vapor guide portion 152 and the inner circumferential surface 110a of the filler neck body 110 define a space 158a that connects the introduction path 115P with the fuel passage 100P. The vapor guide portion 152 and the inner circumferential surface 110a of the filler neck body 110 also define a space 158b that is located upstream of the space 158a and does not directly communicate with the introduction path 115P. In a location symmetrical to the space 158a with respect to the axis OL2 (location on the −Z-axis direction side), the outer circumferential surface of the nozzle guide 150 and the inner circumferential surface 110a of the filler neck body 110 define a space 158c. The space 158a, the space 158b and the space 158c communicate with one another by a labyrinthine structure defined by the outer circumferential surface of the nozzle guide 150 and the inner circumferential surface 110a of the filler neck body 110.

As shown in FIG. 5, the nozzle guide 150 has a reinforcement rib 151 formed along an outer circumferential surface between the vapor guide portion 152 and a lower end 150y of the nozzle guide 150 to increase the strength of the nozzle guide 150. The reinforcement rib 151 is formed parallel to the axis OL2 and is protruded radially outward about the axis OL2 from the outer circumferential surface of the nozzle guide 150. According to this embodiment, the lower end 150y of the nozzle guide 150 placed inside of the filler neck body 110 and a downstream lower end of the reinforcement rib 151 formed on the outer circumferential surface of the nozzle guide 150 are located closer to the fuel tank FT than a downstream lower end of the filler neck body 110. In other words, the lower end of the nozzle guide 150 and the lower end of the reinforcement rib 151 are extended along the axial direction to be located downstream of the lower end of the filler neck body 110. As shown in FIG. 5, the amount of radially outward protrusion at the lower end of the reinforcement rib 151 is gradually decreased toward downstream, so that the reinforcement rib 151 is chamfered in an arc shape (R shape) in a section along the axial direction. The fuel vapor circulated through the introduction path 115P to the filler neck body 110 joins with the fuel supplied from the fueling nozzle NZ in the vicinity of a junction 100 Pa below the lower end of the nozzle guide 150. The reinforcement rib 151 corresponds to the first rib in the claims.

The filler tube 40 includes a press-fit portion 40a that is press fit on the corrugated portion 111, a middle portion 40b that is connected on its downstream side with the press-fit portion 40a, and a flow-in portion 40c that is connected on its downstream side with the middle portion 40b. The middle portion 40b is tapered toward a downstream end of the corrugated portion 111 to have an inner diameter that is approximately equal to the inner diameter of the corrugated portion 111 of the filler neck body 110. The flow-in portion 40c forms the fuel passage 100P from the lower end 150y to the fuel tank FT. The fuel passage 100P has a diameter that is equal to the smallest diameter of the middle portion 40b at the lower end 150y of the nozzle guide 150. In other words, the middle portion 40b is extended to downstream of the corrugated portion 111 and has the larger diameter than the flow-in portion 40c. The flow-in portion 40c has the inner circumference eccentrically arranged to be smoothly continuous, at the lower end 150y of the nozzle guide 150, with the inner circumference of the nozzle guide 150 that is located on the opposite side (−Z-axis direction side) opposite to the breather port 115 and located below the breather port 115 in the vertical direction in the state that the fuel supply apparatus FS is mounted in the vehicle. A seal ring (not shown) is placed between the corrugated portion 111 of the filler neck body 110 and the filler tube 40 to prevent the liquid fuel and the fuel vapor from flowing out.

Figure 8:
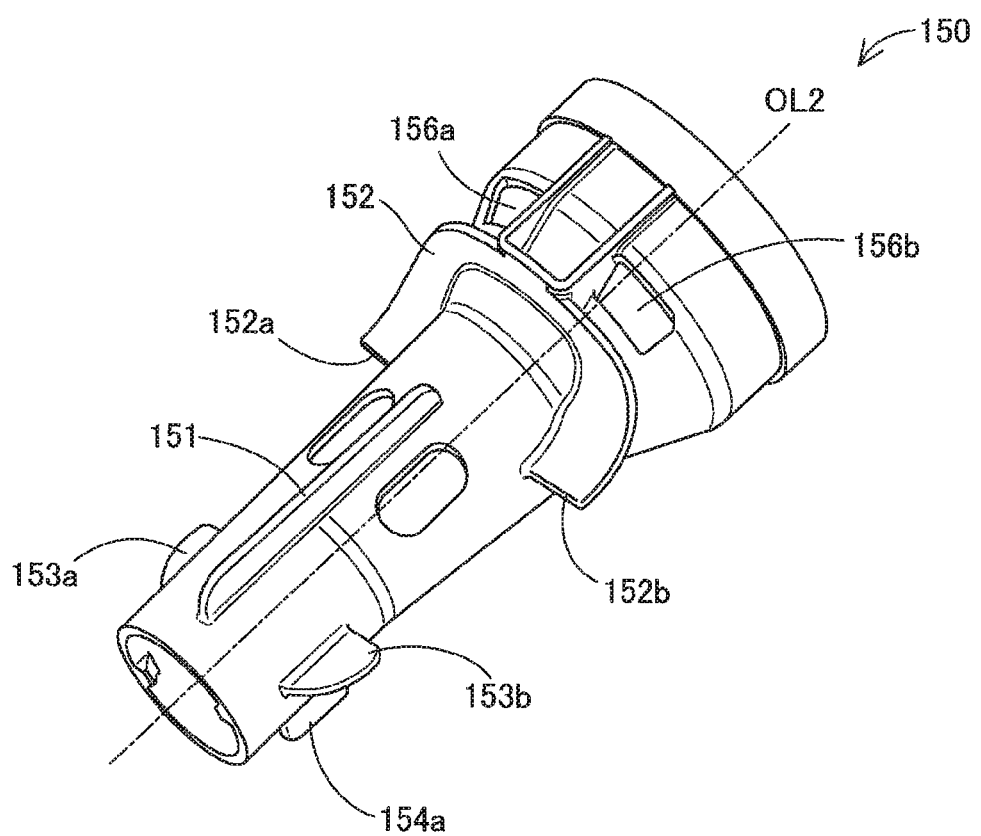
FIG. 8 is a perspective view illustrating the nozzle guide.
Figure 9:
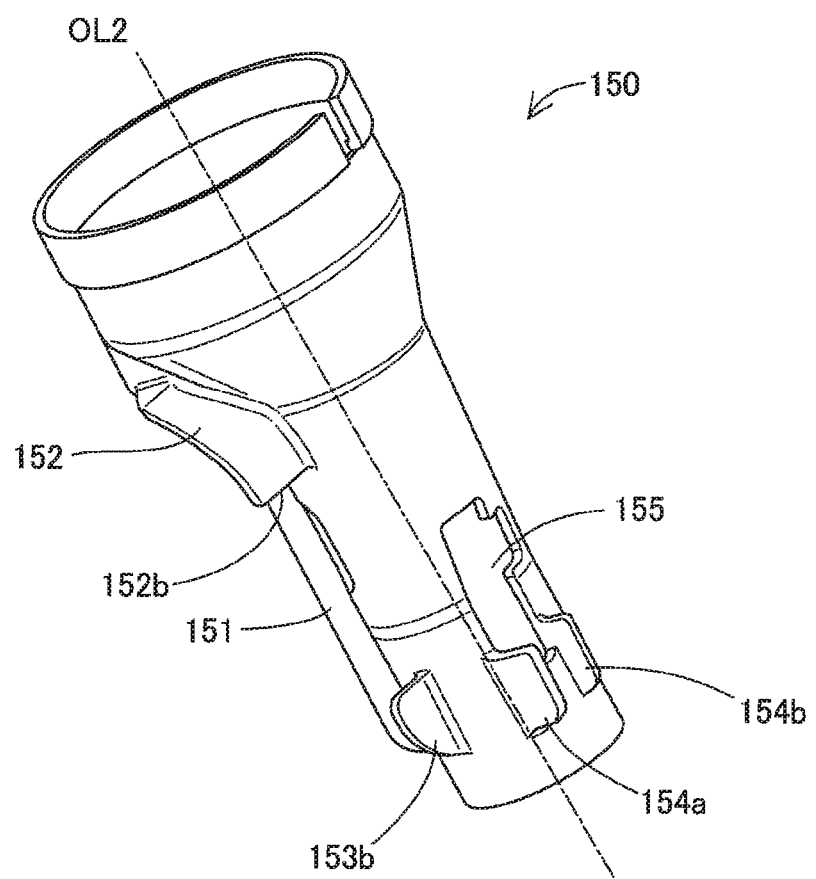
FIG. 9 is a perspective view illustrating the nozzle guide.

FIGS. 7A to 7D are four side views of the nozzle guide 150. FIG. 7A is a left side view illustrating the nozzle guide 150, FIG. 7B is a front view illustrating the nozzle guide 150, FIG. 7C is a right side view illustrating the nozzle guide 150, and FIG. 7D is a rear view illustrating the nozzle guide 150. FIGS. 8 and 9 are perspective views illustrating the nozzle guide 150. The front view and the right side view of the nozzle guide 150 shown in FIGS. 7B and 7C respectively correspond to the front view and the right side view of the filler neck 100 shown in FIGS. 4A and 4B.

As shown in FIGS. 7A, 7B and 7C, the vapor guide portion 152 is formed in a configuration that is bent along the cylindrical outer circumferential surface of the nozzle guide 150 to be directed to downstream on the inner side closer to the axis OL2 as the center. The vapor guide portion 152 is formed in a configuration that the fuel vapor circulated to the introduction path 115P does not directly flow into the space 158c (shown in FIG. 5) on the opposite side about the axis OL2. The nozzle guide 150 has a first communication hole 156a and a second communication hole 156b (hereinafter may be collectively called "communication holes 156a and 156b") upstream of the vapor guide portion 152. The communication holes 156a and 156b are arranged to make the fuel passage 100P communicate with the spaces 158a, 158b and 158c shown in FIG. 5. The communication holes 156a and 156b are formed upstream of the vapor guide portion 152, so that the fuel vapor passing through the introducing path 115P is introduced to downstream by the vapor guide portion 152 and does not cause the fuel vapor to directly flow into the fuel passage 100P upstream of the filler neck 100 through the communication holes 156a and 156b. In other words, the fuel vapor is flowed along the circumferential direction on the outer circumference of the nozzle guide 150 to the communication holes 156a and 156b.

As shown in FIGS. 7C, 7D and 9, the nozzle guide 150 has a sensor-corresponding hole 155 formed on the cylindrical outer circumferential surface of the nozzle guide 150 to make the fuel passage 100P communicate with the space 158c (shown in FIG. 5). According to this embodiment, the sensor-corresponding hole 155 is an opening in the combined shape of two rectangles as shown in FIG. 7D. The sensor-corresponding hole 155 has an enlarged hole portion 155a formed along the axial direction to be open wider than the remaining portion in the circumferential direction about the axis OL2. The sensor-corresponding hole 155 is provided on the opposite side to the breather port 115 about the axis OL2 and is located below the breather port 115 in the state that the fuel supply apparatus FS is mounted in the motor vehicle. The broken line of FIG. 7D showing the enlarged hole portion 155a is a phantom line for explaining the enlarged hole portion 155a and does not indicate the actual configuration of the nozzle guide 150. According to another embodiment, the sensor-corresponding hole 155 may be formed in a different configuration.

As shown in FIGS. 7D and 9, the nozzle guide 150 has a first hole rib 154a and a second hole rib 154b that are formed along a downstream portion of the sensor-corresponding hole 155 to be protruded radially outward from the cylindrical outer circumferential surface of the nozzle guide 150. The first hole rib 154a and the second hole rib 154b are formed parallel to the axis OL2. The first hole rib 154a and the second hole rib 154b are formed at the corresponding positions along the axis OL2 to have the same length along the axis OL2 and the same height of radially outward protrusion from the outer circumferential surface of the nozzle guide 150. In the description hereafter, the first hole rib 154a and the second hole rib 154b may be collectively called "hole ribs 154a and 154b". The hole ribs 154a and 154b correspond to the second rib in the claims.

As shown in FIGS. 7B and 8, the nozzle guide 150 has a first rectifier rib 153a and a second rectifier rib 153b that are protruded radially outward from the cylindrical outer circumferential surface of the nozzle guide 150 and are formed away from the vapor guide portion 152. As shown in FIG. 7A, the first rectifier rib 153a is formed along the axis OL2 to be located downstream of a first downstream end 152a that is one end on the downstream side of the vapor guide portion 152. Similarly, as shown in FIG. 7C, the second rectifier rib 153b is formed along the axis OL2 to be located downstream of a second downstream end 152b that is the other end on the downstream side of the vapor guide portion 152. The first rectifier rib 153a and the second rectifier rib 153b are formed at different positions on the nozzle guide 150 but have identical configurations to be protruded from the cylindrical outer circumferential surface of the nozzle guide 150. The first rectifier rib 153a is formed parallel to the axis OL2. The amount of radially outward protrusion of the first rectifier rib 153a is maximum at its upstream end and is gradually reduced to downward. In the description hereafter, the first rectifier rib 153a and the second rectifier rib 153b may be collectively called "rectifier ribs 153a and 153b".

(3) Functions and Advantageous Effects of Reinforcement Rib 151

The configuration of the above embodiment has the following advantageous effects.

Figure 10:
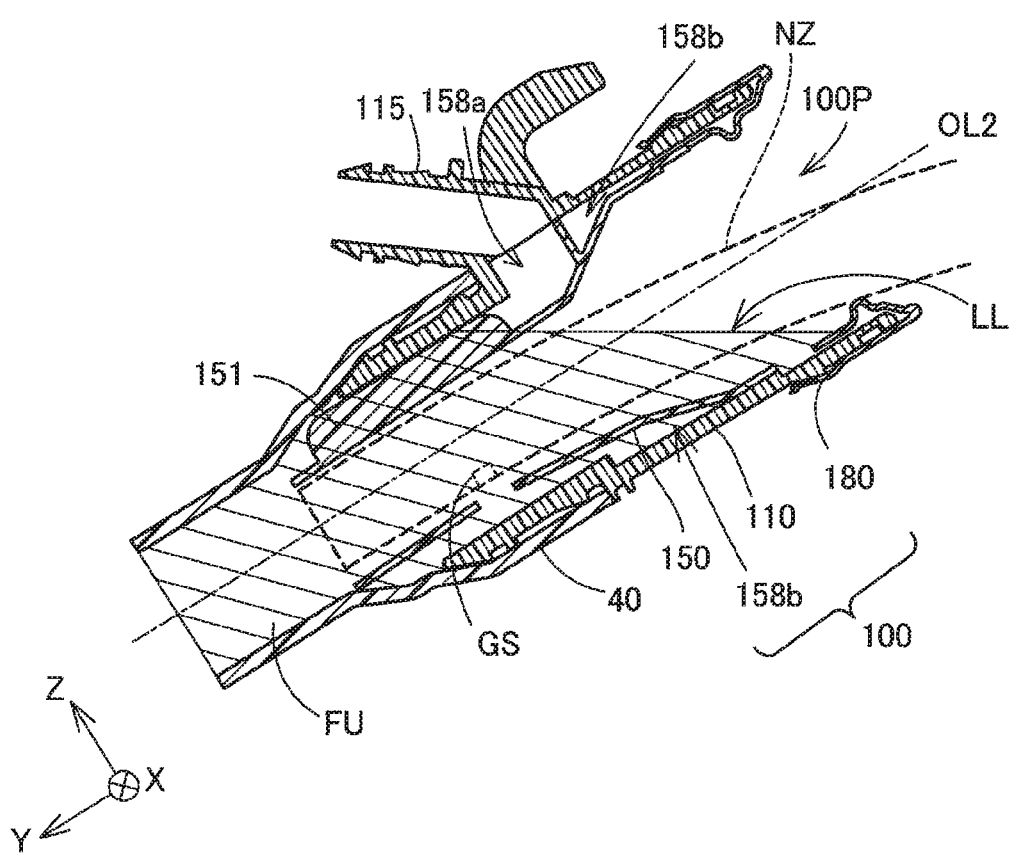
FIG. 10 is a sectional view illustrating an exemplary state that fuel is supplied to the filler neck.

FIG. 10 is a sectional view illustrating an exemplary state that fuel FU is supplied to the filler neck 100. FIG. 10 shows the fuel FU (shown by hatching) supplied to a liquid level LL by a fueling nozzle NZ inserted into the filler neck 100. In general, a gas sensor GS is provided on a leading end NZa of the fueling nozzle NZ to detect the liquid level LL of the supplied fuel FU. The gas sensor GS is configured to intake the air but not to intake the fuel FU in the liquid form, so as to detect the liquid level LL of the fuel FU. As shown in FIG. 10, even when the gas sensor GS detect the liquid level LL of the supplied fuel FU and outputs a signal for stopping the supply of the fuel FU, the fuel FU remaining inside of the fueling nozzle NZ and the like is still supplied to the filler neck 100. The liquid level LL of the fuel FU thus rises above the position of the gas sensor GS. There is accordingly a need to increase the capacity of the filler neck, in order to prevent overflow of the supplied fuel FU from the filler neck 100. The configuration of reducing the length in the axial direction of the filler neck 100 and increasing the sectional area of the filler neck 100 suppresses a rise in liquid level LL of the fuel FU supplied after detection of the liquid level LL of the fuel FU by the gas sensor GS.

In the fuel supply apparatus FS of the embodiment, the sectional area of the filler neck body 110 is increased with a view to increasing the sectional area of the filler neck 100. Increasing the diameter of the corrugated portion 111 which the filler tube 40 is press-fit on reduces the strength of the corrugated portion 111 in the case where the wall thickness of the corrugated portion 111 is fixed. Forming the reinforcement rib 151, however, enhances the strength of the corrugated portion 111 against an external force applied to the inner circumference. In the fuel supply apparatus FS of the embodiment, the presence of the reinforcement rib 151 reduces a clearance between the inner circumferential surface 110a of the filler neck body 110 and the outer circumferential surface of the nozzle guide 150. This reduces rattle between the filler neck body 110 and the nozzle guide 150. The inner diameter of the nozzle guide 150 can be set according to the diameter of the fueling nozzle NZ inserted. This reduces rattle between the nozzle guide 150 and the fueling nozzle NZ inserted into the nozzle guide 150. In the fuel supply apparatus FS of the embodiment, forming the reinforcement rib 151 increases the diameter of the filler neck 100 without increasing the wall thickness of the filler neck 100 as shown in FIG. 10. This configuration ensures the sufficient capacity of the filler neck 100 even when the length in the axial direction of the filler neck 100 is decreased. This suppresses a rise in liquid level LL of the fuel FU supplied after detection of the liquid level LL of the supplied fuel FU by the gas sensor GS for the fueling nozzle NZ and allows for downsizing of the filler neck 100.

In the fuel supply apparatus FS of the embodiment, the reinforcement rib 151 is protruded in the radial direction from the outer circumferential surface of the nozzle guide 150. This enables the reinforcement rib 151 to be readily manufactured at the position relative to the nozzle guide 150 according to the design values. Additionally, there is no need to provide the reinforcement rib 151 as a separate member different from the filler neck body 110 and the nozzle guide 150. This reduces the total number of components constituting the filler neck 100 and facilitates manufacture of the fuel supply apparatus FS.

In the fuel supply apparatus FS of the embodiment, as shown in FIGS. 5 and 6, the downstream lower end 150y of the nozzle guide 150 and the lower end of the reinforcement rib 151 are located on the downstream side or more specifically on the fuel tank FT-side of the downstream end of the filler neck body 110. In the fuel supply apparatus FS of the embodiment, the reinforcement rib 151 of the nozzle guide 150 can thus support an end of the corrugated portion 111 which receives a largest force applied in the course of press-fitting the filler tube 40 on the corrugated portion 111.

In the fuel supply apparatus FS of the embodiment, the amount of radially outward protrusion of the reinforcement rib 151 is gradually decreased toward downstream. This configuration avoids the reinforcement rib 151 from interfering with press-fit of the filler tube 40 on the corrugated portion 111 and enables the filler tube 40 to be smoothly press-fit on the corrugated portion 111.

(4) Functions and Advantageous Effects of Hole Ribs 154a and 154b

According to the embodiment, the hole ribs 154a and 154b are provided on the downstream side of the sensor-corresponding hole 155 to be protruded from the outer circumferential surface of the nozzle guide 150 and to be extended in the axial direction along the sensor-corresponding hole 155. The hole ribs 154a and 154b formed along the sensor-corresponding hole 155 makes the fuel that is supplied from the fueling nozzle NZ inserted into the fuel supply apparatus FS to raise the liquid level, likely to be introduced to the sensor-corresponding hole 155. This configuration enables the gas sensor that is provided on the leading end NZa of the fueling nozzle NZ and is located at the position corresponding to the position of the sensor-corresponding hole 155 in the state of insertion into the fuel supply apparatus FS, to detect the liquid level of the fuel introduced to the sensor-corresponding hole 155 at the predetermined position. The configuration of the fuel supply apparatus FS of the embodiment thus enables the gas sensor for the fueling nozzle NZ to more quickly detect the liquid level of the supplied fuel and thereby suppresses overflow of the supplied fuel.

In the fuel supply apparatus FS of the embodiment, the hole ribs 154a and 154b are formed to be adjacent to the sensor-corresponding hole 155 and to be extended from the lower end of the sensor-corresponding hole 155, so as to be configured along the downstream lower end of the sensor-corresponding hole 155 as well as along the other portion of the sensor-corresponding hole 155. In the fuel supply apparatus FS of the embodiment, this configuration introduces the fuel supplied to raise the liquid level, to the lower end of the sensor-corresponding hole 155 that corresponds to the lowermost position of the liquid level of the supplied fuel. This enables the gas sensor for the fueling nozzle NZ to more quickly detect the liquid level of the supplied fuel.

In the fuel supply apparatus FS of the embodiment, the hole ribs 154a and 154b are formed integrally with the nozzle guide 150 to be protruded radially outward from the outer circumferential surface of the nozzle guide 150. In the fuel supply apparatus FS of the embodiment, the hole ribs 154a and 154b are provided on the nozzle guide 150 in which the sensor-corresponding hole 155 is formed. This enables the hole ribs 154a and 154b to be readily manufactured at the positions relative to the sensor-corresponding hole 155 according to the design values. This reduces the total number of components placed inside of the filler neck body 110 and facilitates manufacture of the fuel supply apparatus FS.

In the fuel supply apparatus FS of the embodiment, as shown in FIG. 7D, the hole ribs 154a and 154b are provided in the linear form parallel to the axial direction to be protruded radially outward from the outer circumferential surface of the nozzle guide 150. In the fuel supply apparatus FS of the embodiment, the hole ribs 154a and 154b are formed parallel to the axial direction that corresponds to the direction in which the liquid level of the supplied fuel rises. This configuration enables the supplied fuel to be more smoothly introduced to the sensor-corresponding hole 155.

In the fuel supply apparatus FS of the embodiment, as shown in FIG. 7D, the first hole rib 154a and the second hole rib 154b are arranged symmetrically with respect to the axial direction of the sensor-corresponding hole 155. In the fuel supply apparatus FS of the embodiment, this configuration enables the fuel supplied to raise the liquid level to be more smoothly introduced to the lower end of the sensor-corresponding hole 155.

B. Modifications

The invention is not limited to the above embodiment, but a diversity of variations and modifications may be made to the embodiment without departing from the scope of the invention. Some examples of possible modification are described below.

The reinforcement rib may be configured to have a cut as a fragile portion. In the filler neck having the reinforcement rib including the fragile portion, in response to an external force applied, the reinforcement rib is broken from the fragile portion prior to the other part. This configuration protects the other part from the potential damage. The fragile portion is not limited to the cut but may be provided in any of various other configurations.

Figure 11:
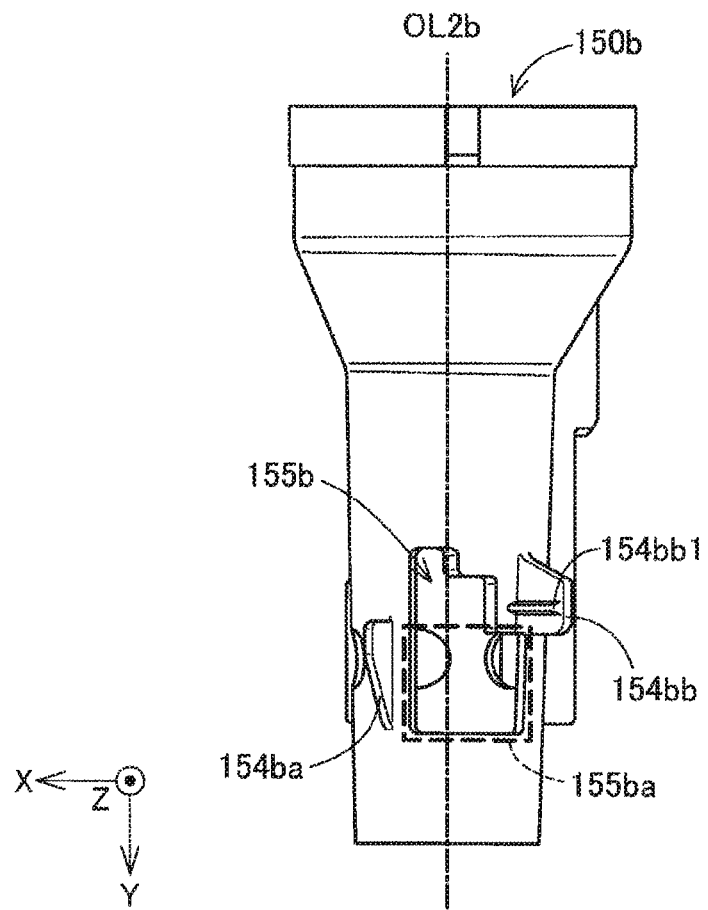
FIG. 11 is a rear view illustrating a nozzle guide according to a modification.
Figure 12:
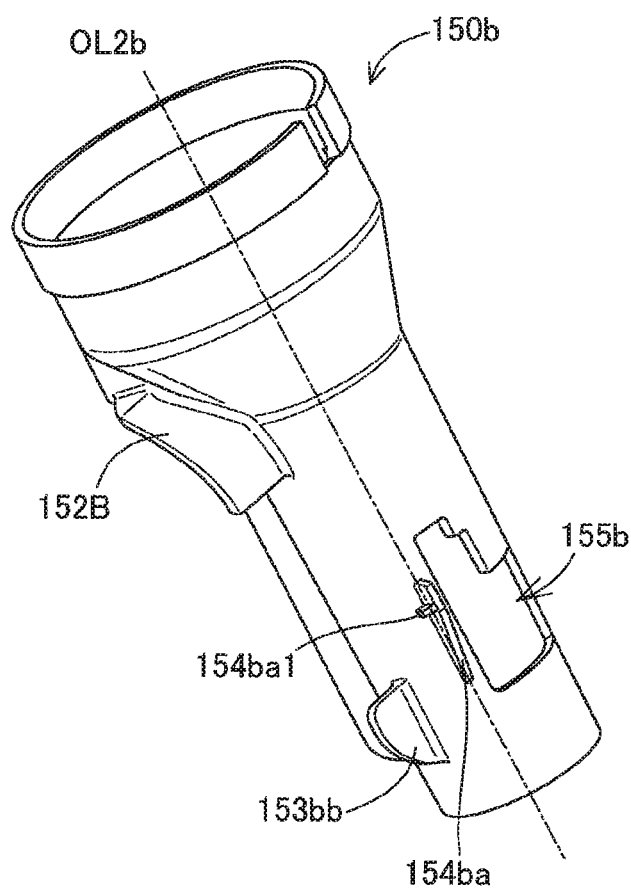
FIG. 12 is a perspective view illustrating the nozzle guide of the modification.

FIG. 11 is a rear view illustrating a nozzle guide 150b according to a modification. FIG. 12 is a perspective view illustrating the nozzle guide 150b of the modification. The nozzle guide 150b of the modification differs from the nozzle guide 150 of the above embodiment by the configuration of a sensor-corresponding hole 155b formed in the nozzle guide 150b and first and second hole ribs 154ba and 154bb formed in the vicinity of the sensor-corresponding hole 155b on the outer circumferential surface of the nozzle guide 150b. As shown by the broken line in FIG. 11, the sensor-corresponding hole 155b has an enlarged hole portion 155ba that is provided on its downstream portion to be open wider than the remaining portion in the circumferential direction about an axis OL2b of the nozzle guide 150b. The broken line of FIG. 11 is a phantom line and does not indicate the actual configuration of the nozzle guide 150b.

As shown in FIG. 11, unlike the hole ribs 154a and 154b of the above embodiment, the first hole rib 154ba and the second hole rib 154bb are provided not to adjoin to the sensor-corresponding hole 155b. In other words, the first hole rib 154ba and the second hole rib 154bb of the modification are adjacent to the sensor-corresponding hole 155b across respective portions of the cylindrical outer circumferential surface of the nozzle guide 150b. As shown in FIG. 11, the amount of protrusion of the second hole rib 154bb from the outer circumferential surface of the nozzle guide 150b is increased toward downstream. The position of the second hole rib 154bb is different from and upstream of the position of the first hole rib 154ba along the axis OL2b of the nozzle guide 150b. The second hole rib 154bb is not a linear protrusion formed along the axis OL2b but has an auxiliary rib 154bb1 provided perpendicularly to the axis OL2b. As shown in FIG. 12, the first hole rib 154ba has an auxiliary rib 154ba1 provided perpendicularly to the axis OL2b, like the second hole rib 154bb. As described above, the configurations of the sensor-corresponding hole and the hole ribs may be modified in any of various ways, like the sensor-corresponding hole 155b formed in the nozzle guide 150b and the hole ribs 154ba and 154bb provided in the vicinity of the sensor-corresponding hole 155b.

Figure 13:
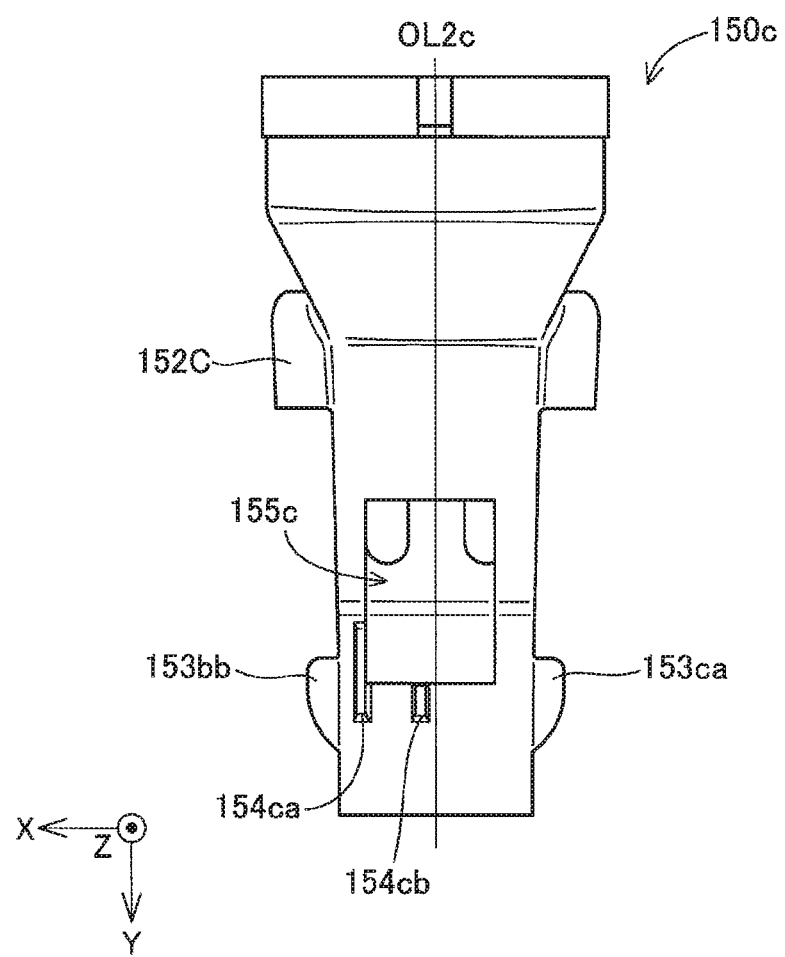
FIG. 13 is a rear view illustrating a nozzle guide according to another modification.

FIG. 13 is a rear view illustrating a nozzle guide 150c according to another modification. The nozzle guide 150c of the modification shown in FIG. 13 differs from the nozzle guide 150 of the above embodiment by the configuration of a sensor-corresponding hole 155c formed in the nozzle guide 150c and first and second hole ribs 154ca and 154cb formed on the outer circumferential surface of the nozzle guide 150c. As shown in FIG. 13, the sensor-corresponding hole 155c formed in the outer circumferential surface of the nozzle guide 150c is in a rectangular shape having longer sides along the axial direction in the rear view. The first hole rib 154ca is formed adjacent to the longer side of the sensor-corresponding hole 155c, like the first hole rib 154a of the above embodiment. The second hole rib 154cb is, on the other hand, a protrusion that is provided adjacent to the downstream shorter side of the sensor-corresponding hole 155c that is perpendicular to the axial direction of the sensor-corresponding hole 155c to be extended to downstream along the axial direction, unlike the second hole rib 154b of the above embodiment. As shown in FIG. 13, the length of the first hole rib 154ca in the axial direction is longer than the length of the second hole rib 154cb in the axial direction. A lower end of the first hole rib 154ca and a lower end of the second hole rib 154cb are located at the same positions in the axial direction. Like the hole ribs 154ca and 154cb formed on the nozzle guide 150c of the modification, the configuration of the hole ribs may be modified in any of various ways. The configuration of the sensor-corresponding hole may also be modified in any of various ways.

Figure 14:
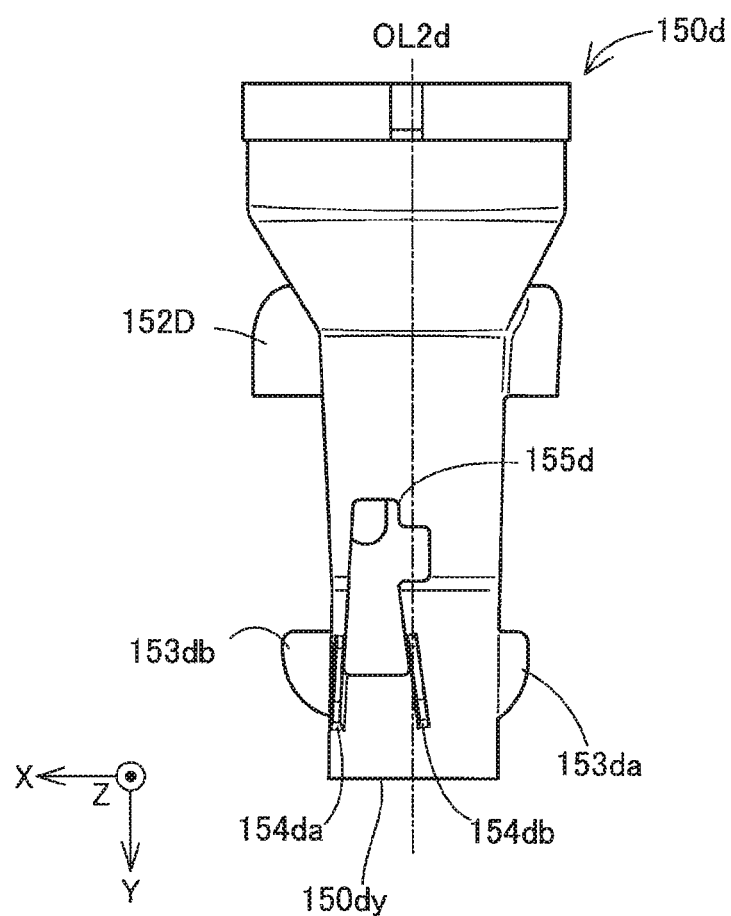
FIG. 14 is a rear view illustrating a nozzle guide according to another modification.

FIG. 14 is a rear view illustrating a nozzle guide 150d according to another modification. The nozzle guide 150d of the modification shown in FIG. 14 differs from the nozzle guide 150 of the above embodiment by the configuration of a sensor-corresponding hole 155d formed in the nozzle guide 150d and first and second hole ribs 154da and 154db formed along a downstream portion of the sensor-corresponding hole 155d. According to this modification, as shown in FIG. 14, the downstream portion of the sensor-corresponding hole 155d is formed in a trapezoidal shape that increases the opening area toward a lower end 150dy of the nozzle guide 150d. As shown in FIG. 14, the first hole rib 154da is provided adjacent to the sensor-corresponding hole 155d to be extended to the downstream side of the sensor-corresponding hole 155d in the axial direction. Similarly, the second hole rib 154db is located at the symmetrical position with respect to the sensor-corresponding hole 155d and is provided adjacent to the sensor-corresponding hole 155d to be extended to the downstream side of the sensor-corresponding hole 155d in the axial direction. Like the hole ribs 154da and 154db of this modification, the hole ribs may be extended in any of various adequate directions and may not be necessarily extended along the axial direction.

There are various other modifications with regard to the hole ribs 154a and 154b formed along with the sensor-corresponding hole 155 that is formed in the nozzle guide 150 to make the fuel passage 100P communicate with the space 158a defined by the inner circumferential surface 110a of the filler neck body 110 and the outer circumferential surface of the nozzle guide 150. For example, the hole ribs may not be necessarily formed on the outer circumferential surface of the nozzle guide 150 like the embodiment and the modifications described above but may be formed to be protruded radially inward from the inner circumferential surface of the filler neck body 110. The hole ribs may also be provided as separate members from the filler neck body 110 and the nozzle guide 150 in the filler neck 100. The configuration and the number of the hole ribs may be modified in any of various ways, and the number of the hole ribs may be only one or may be three or more unlike the embodiment and the modifications described above. The hole rib may not be necessarily configured in the linear form in the rear view like the configurations of FIGS. 7D, 11, 13 and 14 but may be in a curved form or may be in another adequate form. The amount of protrusion of the hole rib is constant according to the embodiment and the modifications described above. According to another modification, however, the amount of protrusion of the hole rib may be increased or may be decreased toward downstream. The protruded and extended hole rib may have a through hole in the circumferential direction. The extended hole rib may be divided into separate portions. The hole rib may be formed in any configuration such that the fuel raising the liquid level and flowing back to the filler neck 100 after filling the fuel tank FT is introduced to the downstream portion of the sensor-corresponding hole formed in the nozzle guide.

The invention is not limited to any of the embodiment, the examples and the modifications described above but may be implemented by a diversity of other configurations without departing from the scope of the invention. For example, the technical features of any of the embodiment, examples and modifications corresponding to the technical features of each of the aspects described in SUMMARY may be replaced or combined appropriately, in order to solve part or all of the problems described above. Any of the technical features may be omitted appropriately unless the technical feature is described as essential herein.

The invention claimed is:

1. A fuel supply apparatus, comprising:
a filler neck body that is configured to include a hollow fuel passage-forming portion arranged to define a fuel passage which a supplied fuel passes through, a fitting portion configured to be fit in a tube arranged to introduce the supplied fuel to a fuel tank, and a fuel-tank-side end that faces a fuel tank;
a nozzle guide that is placed inside of the fuel passage-forming portion and is configured to introduce a fueling nozzle for supplying the fuel and that includes a fuel tank side end; and
a first rib that extends along an axial direction of the nozzle guide, that is provided at a position opposite to the fitting portion to be placed between the filler neck body and the nozzle guide and to be in contact with an outer circumferential surface of the nozzle guide, that is formed integrally with the nozzle guide to be protruded from the outer circumferential surface of the nozzle guide, and that includes a fuel-tank-side end, wherein
the fuel-tank-side end of the nozzle guide and the fuel-tank-side end of the first rib are located closer to the fuel tank than the fuel-tank-side end of the filler neck body.

2. The fuel supply apparatuses according to claim 1, wherein the first rib comprises a plurality of protrusions that are extended parallel to an axial direction of the nozzle guide.

3. The fuel supply apparatus according to claim 2, wherein an amount of protrusion of the first rib in a radial direction at the fuel-tank-side end is reduced toward the fuel tank.

4. The fuel supply apparatuses according to claim 1, wherein an amount of protrusion of the first rib in a radial direction at a fuel-tank-side end is reduced toward the fuel tank.

5. The fuel supply apparatuses according to claim 1, wherein the nozzle guide introduces the fueling nozzle in a first direction from a body opening of the filler neck body in which the fueling nozzle is inserted toward the fuel tank, and
the nozzle guide has an opening configured to make the fuel passage communicate with an outer circumferential space that is defined by the fuel passage-forming portion and an outer circumferential surface of the nozzle guide,
the fuel supply apparatus further comprising
a second rib that is provided on a fuel tank side of the opening and is configured such that the fuel flowing back to the filler neck body after filling the fuel tank is introduced to the opening.

6. The fuel supply apparatuses according to claim 5, wherein the second rib is formed adjacent to a portion of the opening other than the fuel tank side of the opening.

7. The fuel supply apparatuses according to claim 6, wherein the second rib is formed integrally with the nozzle guide to be protruded radially outward from the outer circumferential surface of the nozzle guide.

8. The fuel supply apparatuses according to claim 7, wherein the second rib is formed to be protruded linearly parallel to the first direction.

9. The fuel supply apparatuses according to claim 8, wherein a plurality of the second ribs are formed symmetrically with respect to the opening in the first direction.

10. The fuel supply apparatus according to claim 1, wherein
the filler neck body is press-fitted in a filler tube.

11. The fuel supply apparatus according to claim 10, wherein
the filler neck body has a corrugated portion to be press-fitted in the filler tube, the corrugated portion is formed in a corrugated shape.

12. A fuel supply apparatus, comprising:
a filler neck body that is configured to include a hollow fuel passage-forming portion arranged to define a fuel passage which a supplied fuel passes through, and a fitting portion configured to be fit in a tube arranged to introduce the supplied fuel to a fuel tank;
a nozzle guide that is placed inside of the fuel passage-forming portion and is configured to introduce a fueling nozzle for supplying the fuel in a first direction from a body opening of the filler neck body in which the fueling nozzle is inserted toward the fuel tank, the nozzle guide has an opening configured to make the fuel passage communicate with an outer circumferential space that is defined by the fuel passage-forming portion of the filler neck body and an outer circumferential surface of the nozzle guide;
a first rib that is provided at a position opposite to the fitting portion of the filler neck body to be placed between the filler neck body and the nozzle guide;
a second rib that is provided on a fuel tank side of the opening and is configured such that the fuel flowing back to the filler neck body after filling the fuel tank is introduced to the opening of the nozzle guide; and
a plurality of the second ribs are formed symmetrically with respect to the opening of the nozzle guide in the first direction.

13. The fuel supply apparatus according to claim 12, wherein the second rib is formed adjacent to a portion of the opening other than the fuel tank side of the opening.

14. The fuel supply apparatus according to claim 13, wherein the second rib is formed integrally with the nozzle guide to be protruded radially outward from the outer circumferential surface of the nozzle guide.

15. The fuel supply apparatus according to claim 14, wherein the second rib is formed to be protruded linearly parallel to the first direction.

16. The fuel supply apparatus according to claim 12, wherein
the filler neck body is press-fitted in a filler tube.

17. The fuel supply apparatus according to claim 16, wherein
the filler neck body has a corrugated portion to be press-fitted in the filler tube, the corrugated portion is formed in a corrugated shape.

18. The fuel supply apparatus according to claim 1, wherein
the filler tube includes a press-fit portion configured to receive the fitting portion of the filler neck body,
the first rib is configured to press the fitting portion of filler neck body into the press-fit portion of the filler tube.

* * * * *